US008760174B2

(12) United States Patent
Kleismit et al.

(10) Patent No.: US 8,760,174 B2
(45) Date of Patent: Jun. 24, 2014

(54) EVANESCENT MICROWAVE MICROSCOPY PROBE AND METHODOLOGY

(75) Inventors: Richard A. Kleismit, Dayton, OH (US); Barbara E. Hull, Dayton, OH (US); Gregory Kozlowski, Dayton, OH (US); Brent Foy, Dayton, OH (US)

(73) Assignee: Wright State University, Dayton, OH (US)

( * ) Notice: Subject to any disclaimer, the term of this patent is extended or adjusted under 35 U.S.C. 154(b) by 728 days.

(21) Appl. No.: 12/999,386

(22) PCT Filed: Jun. 26, 2009

(86) PCT No.: PCT/US2009/048824
§ 371 (c)(1),
(2), (4) Date: Apr. 5, 2011

(87) PCT Pub. No.: WO2009/158598
PCT Pub. Date: Dec. 30, 2009

(65) Prior Publication Data
US 2011/0175627 A1 Jul. 21, 2011

Related U.S. Application Data

(60) Provisional application No. 61/075,841, filed on Jun. 26, 2008.

(51) Int. Cl.
*G01R 27/32* (2006.01)
(52) U.S. Cl.
USPC .......................................... 324/637
(58) Field of Classification Search
USPC ................... 324/629, 637, 638, 639, 646
See application file for complete search history.

(56) References Cited

U.S. PATENT DOCUMENTS

| 5,936,237 | A | 8/1999 | van der Weide | |
|---|---|---|---|---|
| 6,173,604 | B1 * | 1/2001 | Xiang et al. | 73/105 |
| 6,532,806 | B1 * | 3/2003 | Xiang et al. | 73/105 |
| 6,680,617 | B2 | 1/2004 | Moreland et al. | |
| 7,019,537 | B2 * | 3/2006 | Hazel et al. | 324/639 |
| 7,285,963 | B2 * | 10/2007 | Talanov et al. | 324/635 |
| 7,550,963 | B1 * | 6/2009 | Xiang et al. | 324/754.23 |
| 2003/0034453 | A1 | 2/2003 | Ookubo et al. | |
| 2004/0226351 | A1 | 11/2004 | Schafrik et al. | |
| 2004/0227525 | A1 * | 11/2004 | Hazel et al. | 324/637 |
| 2006/0103583 | A1 * | 5/2006 | Kleismit et al. | 343/785 |
| 2006/0173351 | A1 * | 8/2006 | Marcotte et al. | 600/473 |
| 2007/0069741 | A1 * | 3/2007 | Kleismit et al. | 324/638 |
| 2008/0135749 | A1 | 6/2008 | van der Weide et al. | |

OTHER PUBLICATIONS

International Search Report and Written Opinion dated Feb. 2, 2010 pertaining to International Application No. PCT/US2009/048824.

(Continued)

*Primary Examiner* — Patrick Assouad
*Assistant Examiner* — Demetrius Pretlow
(74) *Attorney, Agent, or Firm* — Dinsmore & Shohl LLP

(57) ABSTRACT

The present disclosure generally relates to an evanescent microwave microscopy probe and methods for making and using the same. Some embodiments relate to a probe which is constructed of silver. Other embodiments relate to a method of measuring an unknown property a target material, comprising moving the probe away from the target material, taking a first measurement, moving the probe such that it touches the target material, taking a second measurement, and comparing the first and second measurements in order to measure the unknown property.

18 Claims, 2 Drawing Sheets

(56) References Cited

OTHER PUBLICATIONS

Figure 1:
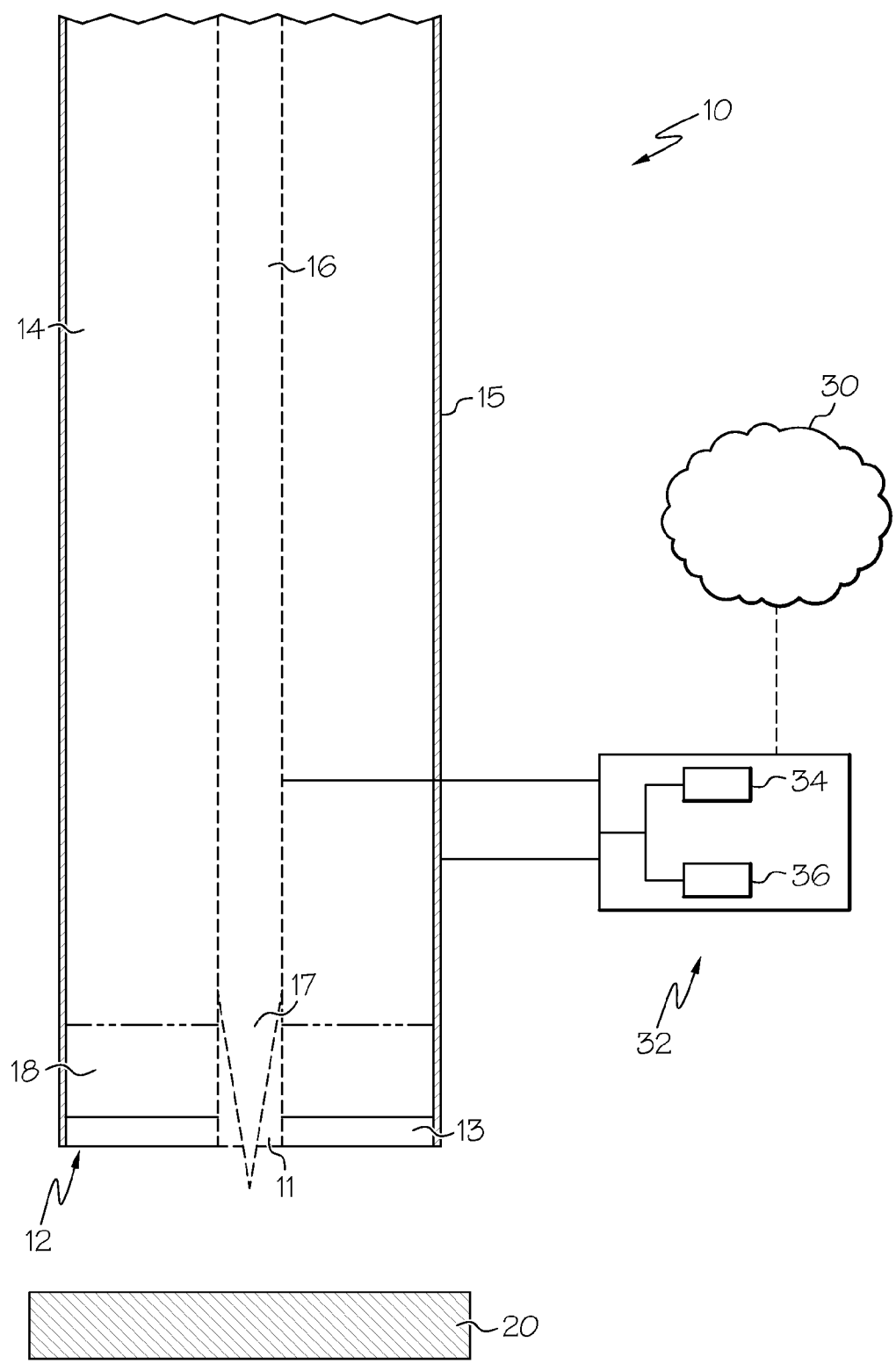

Anlage et al, "Near-Field Microwave Microscopy of Materials Properties", arXiv:cond-mat/0001075v2, Apr. 18, 2000, pp. 1-31.

Gao et al., "Quantitative microwave near-field microscopy of dielectric properties", American Institute of Physics, Review of Scientific Instruments, vol. 69, No. 11, Nov. 1998.

David M. Pozar, "Microwave Engineering", 1990, Addison Wesley Publications, Chapter 1, pp. 19-21, Appendix F.

Kleismit et al., "Characterization of Local Dielectric Properties of Superconductor YBa2Cu3O7-__ Using Evanescent Microwave Microscopy", IEEE Transaction on Applied Superconductivity, vol. 15, No. 2, Jun. 2005, pp. 2915-2918.

Kleismit et al, "Electromagnetic Characterization of Carbon Nanotube Films Subject to an Oxidative Treatment at Elevated Temperature", Journal of Nanoscience and Nanotechnology, vol. 9, No. 4, pp. 1-11, 2009.

Kleismit et al., Evanescent Microwave Microscopy of Thermally-Damaged Charge Coupled Devices, 0-941783-23-5, IEEE, pp. 485-488, 2003.

Kleismit et al., "Evanescent Microwave Sensor Scanning for Detection of Sub-Surface Defects in Wires", IEEE, Aug. 6, 2002, pp. 245-250.

Kleismit et al., "Local complex permittivity measurements of porcine skin tissue in the frequency range from 1 GHz to 15 GHz by evanescent microscopy", IOP Publishing, Institute of Physics and Engineering in Medicine, Physics in Medicine and Biology, 54, pp. 699-173, 2009.

Kleismit et al., "Local dielectric and strain measurements in YBa2Cu3O7-__ thin films by evanescent microscopy and Raman spectroscopy", IOP Publishing, Institute of Physics Publishing, Superconductor Science and Technology 18, pp. 1197-1203, 2005.

Kleismit et al, "Sensitivity and Resolution of Evanescent Microwave Microscope", IEEE Transactions on Microwave Theory and Techniques, vol. 54, No. 2, Feb. 2006, pp. 639-647.

* cited by examiner

EVANESCENT MICROWAVE MICROSCOPY PROBE AND METHODOLOGY

CROSS-REFERENCE TO RELATED APPLICATIONS

This application is a U.S. national phase entry of International Application No. PCT/US2009/048824, filed Jun. 26, 2009, which claims the benefit of U.S. Provisional Application Ser. No. 61/075,841, filed Jun. 26, 2008.

The present disclosure relates to measuring unknown properties of target materials using evanescent microwave fields.

In one embodiment, a method of measuring an unknown property of a target material is provided. According to the method, a probe tip is positioned to a reference distance g from the target material, wherein the reference distance g is greater than the diameter d of the tip aperture hole. A reference measurement of an inherent characteristic of the probe is taken while the probe tip is at the reference distance g and the position of the probe tip is adjusted such that the probe tip is in physical contact with the target material. A second measurement is taken while the probe tip is in physical contact with the target material and the unknown property of the target material is determined by comparing the reference measurement and the second measurement.

In another embodiment, an evanescent microwave microscopy probe is provided comprising a center conductor, an outer shield, an insulating material, and an aperture, wherein the center conductor is capable of operating as a waveguide for microwave radiation and comprises at least approximately 90%, by weight, silver.

Figure 2:
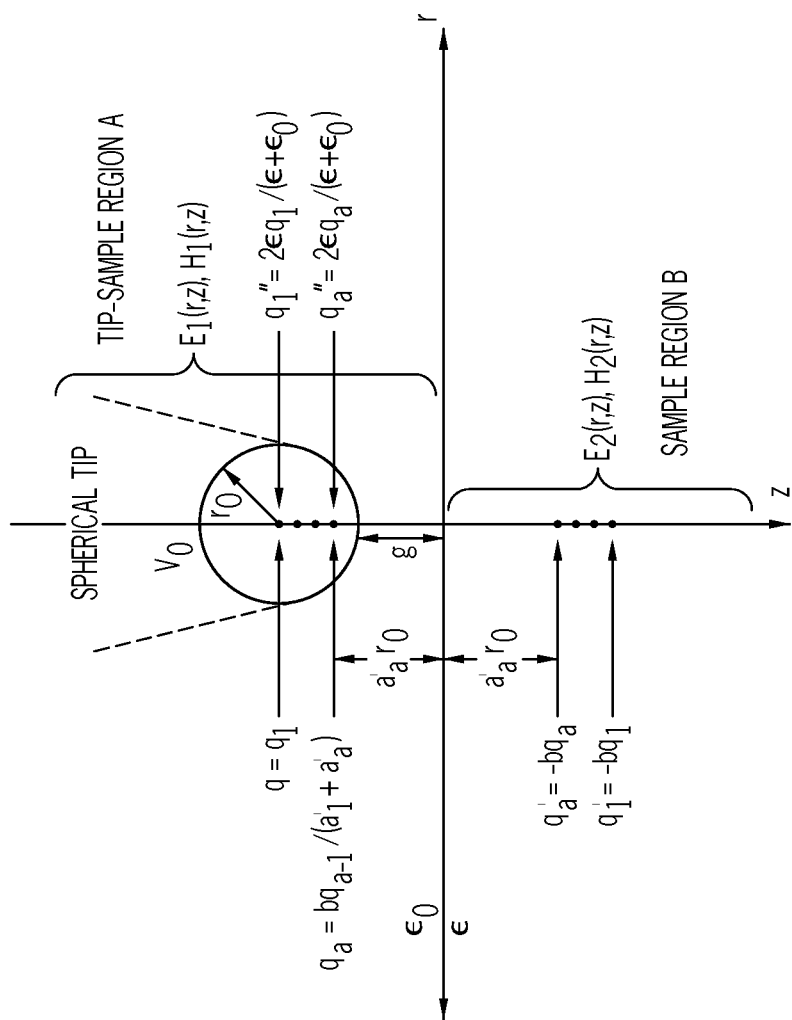

FIG. 1 is a cross-sectional view of a probe in accordance with one embodiment of the present disclosure; and FIG. 2 depicts the probe tip and target material in accordance with one embodiment of the present disclosure.

The present disclosure generally relates to a microwave probe for evanescent microwave microscopy and to methods for using the same for generating high quality microwave imaging data. Evanescent microwave microscopy is based on a coaxial transmission line center conductor with a probe tip protruding through an end-wall aperture. More particularly, the apparatus and method of the present disclosure can be used to take high-precision, low-noise measurements of unknown properties of a target material. Such unknown properties may include but are not limited to permittivity, permeability, conductivity, dielectric constant, and dielectric loss. Other unknown properties may be measured, as is known in the art. Some of these properties may be related to each other such as, for example, the quality factor Q of the probe is proportional to changes in conductivity. Measuring one or more of these unknown properties over the two-dimensional surface of the target material may permit a three-dimensional image of the target material's structure to be ascertained, as will be described herein.

In order to measure the unknown property of the target material, an inherent characteristic of the probe may be measured at two or more locations with respect to the target material. Inherent characteristics of the probe include but are not limited to the quality factor Q, the resonant frequency $f_r$, and the reflection coefficient $S_{11}$. Other inherent characteristics of the probe may be measured as well. For the purposes of describing and defining aspects of the present disclosure, it is noted that the quality factor Q is a measurement that is indicative of the damping of resonator modes of the probe. Generally, the quality factor Q of a resonator is a measure of the strength of the damping of its oscillations. For example, and not by way of limitation, two different common definitions of the quality factor Q of a resonator are referenced in the art. The first definition defines the quality factor Q as $2\pi$ times the ratio of stored energy to energy dissipated per oscillation cycle, or equivalently the ratio of the stored energy to the energy dissipated per radian of the oscillation. For a microwave or optical resonator, one oscillation cycle is understood as corresponding to the field oscillation period, not the round-trip period. The second definition defines the quality factor Q as the ratio of the resonance frequency and the full width at half-maximum bandwidth of the resonance. The resonant frequency $f_r$ can be defined as the "natural" frequency of the probe system, i.e., that which produces larger wave amplitudes than other frequencies. The reflection coefficient can be defined as a representation of the amplitude of a reflected wave in the probe system relative to an incident wave.

The probe may be used to measure an unknown property of a target material in the frequency range from about 1 GHz to 15 GHz. For example, the dielectric property of the target material within the near field of the tip frustrates the electric field and measurably changes the probe's resonant frequency and quality factor (Q). The shift of the probe's resonant frequency and Q is measured as a function of probe tip-target material separation and a quantitative relationship between the real and imaginary parts of the local dielectric constant using the method of images is established. The associated changes in quality factor image scans of various target materials are presented.

In the field of evanescent microwave microscopy, the probe tip operates in close proximity to the target material, where the tip radius and effective field distribution range are much smaller than the probe excitation wavelength, $\lambda$. The propagating field exciting resonance in the probe can be ignored and the probe tip-target material interaction can be treated as quasi-static. This can be used for localized measurements and images with resolved features governed essentially by the characteristic size of the probe tip. The field distribution from the probe tip extends outward a short distance, and as the target material enters the near field of the probe tip, it interacts with the evanescent field, thus perturbing the probe's resonance. This perturbation is linked to the resonant structure of the probe through the coupling capacitance $C_c$ between the tip and the target material. This results in the loading of the resonant probe and alters the resonant frequency $f_r$, quality factor Q, and reflection coefficient $S_{11}$ of the probe.

As a result, the $f_r$, Q, and $S_{11}$ variations related to the microwave properties of the target material can be mapped as the probe tip is scanned over the target material. The microwave properties of a target material are functions of permittivity $\in$, permeability $\mu$, and conductivity $\sigma$.

Referring to FIG. 1, a microwave probe 10 of the present disclosure may be constructed from a 0.085" semi-ridged coaxial transmission line. The probe 10 is based on an end-wall aperture coaxial transmission line, where the transmission line behaves as a series resonant circuit for odd multiples of $\lambda/4$.

In constructing probe 10, the center conductor is removed along with the poly(tetrafluoroethylene) insulator and replaced with, for example, high purity paraffin 14. However, the disclosure is not restricted to paraffin and alternative materials can be used. For example, alternative materials within the scope of the present disclosure include, without limitation, magnesium oxide, titanium oxide, boron nitride, aluminas. Other waveguide materials include copper, aluminum, brass, alum, and any combination thereof. Still other wave guide materials include polytetrafluoroethylene (PTFE), PTFE/glass fabrics such as Taconic RF-35, and various organic polymeric materials and composites.

Fashioning probe 10 according to the foregoing paragraph results in coaxial wave guide probe 10 rather than an open cavity. As shown in FIG. 1, the aperture 12 generally is located near the probe tip 17 and is oriented generally perpendicular to the center conductor 16. The aperture 12 comprises a plate 13, which may comprise copper, copper alloy, aluminum, brass, alum, or any combination thereof. This plate 13, shown in FIG. 1, comprises an inside face, an outside face, and a hole 11 that allows the probe tip 17 to be in microwave communication with the target material 20, and may have a thickness of about 0.010". In addition, the aperture 12 generally is affixed to the outer shield 15, as also shown in FIG. 1. In one embodiment, the aperture 12 is soldered inside outer shield 15, creating end-wall aperture 12. A chemically sharpened probe tip 17 may be found at the end of the center conductor 16. The transmission line is then reconstructed by casting the sharpened center conductor 16 inside the outer shield 15 with high purity paraffin 14. A short section of the original poly(tetrafluoroethylene) shielding replaces paraffin 14 at the sharpened end of the coax, and is located directly above end-wall aperture 12. Poly(tetrafluoroethylene) plug 18 is 60 used to maintain tip-aperture alignment. Sharpened probe tip 17 of center conductor 16 extends beyond shielded end-wall aperture 12 of probe by approximately 0.001" or less. The purely evanescent probing field resonates from sharpened probe tip 17. In this manner, as the radius of center conductor 16 decreases, the spatial resolution of the probe increases due to localization of the interaction between the probe tip 17 and target material 20. The center conductor 16, including the probe tip 17, may be an alloy of silver, wherein the alloy comprises at least approximately 90%, by weight, silver. In another embodiment, the center conductor 16 may comprise an alloy comprising silver and one or more of copper, zinc, tin, or any combination thereof. In yet another embodiment, the center conductor 16 may comprise an alloy comprising silver and copper, for example approximately 97.5% by weight silver and approximately 2.5% by weight copper.

In an alternative embodiment, poly(tetrafluoroethylene) plug 18, which is disposed at the aperture end, can be replaced with a ceramic, for instance a ceramic coating on the inside face of the plate 13. Such a coating may be applied before aperture 12 is soldered to outer shield 15. In one embodiment this is done using a high temperature strain gauge ceramic adhesive, known by the trade-name Ceramabond-67 1. In other embodiments, the coating can be formed through pulsed laser deposition of any of a wide variety of suitable ceramics including, without limitation, cerium oxide. In one embodiment, the coated side (i.e., the inside face) of the plate 13 is optionally chamfered at about 60° prior to coating. Alternatively, the chamfer can be between about 45° and about 75°. This practice results in an increase in Q and reduced reflection.

The microwave excitation frequency of resonant probe 10 can be varied over a bandwidth from about 1 GHz to 15 GHz in network analyzer, and is tuned by external capacitors (not shown). The microscope probe 10 may be coupled to network analyzer through tuning network capacitors 34 and 36, which are connected to center conductor 16 and to outer shield 15.

The changes in the probe's resonant frequency, quality factor (Q), and reflection coefficient may be tracked by a Hewlett-Packard 8722ES network analyzer through $S_{11}$ port measurements, as probe 10 moves above target material surface 20. The microwave excitation frequency of resonant probe 10 can be varied within the bandwidth of network analyzer and tuned to critical coupling with tuning assembly 32. Tuning assembly 32 comprises two variable 2.5 to 8 pF capacitors. The tuning network 30 has one capacitor 34 connected in-line with center conductor 16, and the other capacitor 36 is connected from center conductor 16 to ground.

The X-Y axis stage may be driven by Coherent® optical encoded DC linear actuators. Probe 10 is frame-mounted to a Z-axis linear actuator assembly and the height at which probe 10 is above the target material surface 20 can be precisely set. The X-Y stage actuators, network analyzer, and data acquisition and collection are controlled by computer. The program that interfaces to the X-Y stage actuators, serial port communications, 8722ES GPIB interface, and data acquisition is written in National Instruments Labview® software. The complete evanescent microwave scanning system may be mounted on a vibration-dampening table.

The general theory of operation of the probe may be found in U.S. Pat. No. 7,501,833, entitled "Evanescent Microwave Microscopy Probe and Methodology," the entirety of which in incorporated herein be reference.

As is noted above, the present disclosure relates to methodology for measuring the complex permittivity of a target material through evanescent microwave technology. More particularly, the methodology taught herein is a scheme for investigating the complex permittivity of a material, independent of its other electrical properties, through evanescent microwave microscopy.

In FIG. 2, the probe 10 is measuring an unknown property (e.g., permittivity) of a target material 20. The probe 10 may be moved across the surface of the target material 20 and may make measurements of the unknown property at specific locations on the surface. In order to measure the unknown property at these specific, the method first moves the probe 10 away from the target material 20 such that the distance, g, between the probe tip and the target material 20 is greater than the diameter of the hole of the probe aperture. For example, if the hole is a circle having a diameter of 50 µm, the probe tip 10 is moved at least 50 µm away from the target material 20. For hole geometries which are not circular, the diameter is defined herein as the diameter of the largest circle which will fit inside the hole. For example, if the hole is square, the diameter of the hole is defined as the diameter of the largest circle which will fit inside the square. At this distance, called the reference distance, the target material may have little or no influence on the unknown property being measured. The method then takes a measurement of the unknown property, which may be called the reference measurement. The method may next move the probe 10 to the target material 20 such that the probe 10 contacts the target material 20 (i.e., g=0). The method may then take a measurement of the unknown property, which may be called the second measurement. The method may then compare the reference measurement with the second measurement and, using this comparison, determine the unknown property of the target material 20 at the specific location. This process may be repeated at numerous surface locations on the target material. In this fashion, the unknown property may be determined for the entire surface of the target material 20 or a portion thereof.

The mathematical equations representing the reference measurement and the second measurement are now described herein. As used herein, the word "unperturbed" refers to the case when a reference measurement is being made. Likewise, as used herein, the word "perturbed" refers to the case when a second measurement is being made; that is, the probe is moved such that it is in physical contact with the target material.

The expression for the resonant frequency shift due to the presence of a target material (i.e., perturbed) is:

$$\frac{\Delta f}{f} = -\frac{\int_V (\Delta\varepsilon)(\overline{E}\cdot\overline{E}_0) + (\Delta\mu)(\overline{H}\cdot\overline{H}_0)\,dV}{\int_V (\varepsilon_0 \overline{E}_0^2 + \mu_0 \overline{H}_0^2)\,dV} = \frac{f - f_0}{f}, \quad (1)$$

where $\overline{E}, \overline{H}$ is the perturbed electric and magnetic fields, $\overline{E}_0$, $\overline{H}_0$ is the unperturbed fields, V is the volume of a region outside the probe tip, f is the resonant frequency, and $f_0$ is the unperturbed reference frequency. The unperturbed electric field $\overline{E}_0$ is found by taking the negative gradient of the potential $\phi_0$ due to charge q $$-\nabla\varphi_0 = \frac{q}{4\pi\varepsilon_0}\frac{[r\hat{r} + (z + r_0 + g)\hat{z}]}{[r^2 + (z + r_0 + g)^2]^{3/2}} = \overline{E}_0(r, z), \quad (2)$$

where $r_o$ is tip radius and g is a distance from probe tip to the surface of the target material. Substituting $a = a'_1 r_0 = r_0 + g$ into equation (2) results in $$\overline{E}_0(r, z) = \frac{q}{4\pi\varepsilon_0}\frac{[r\hat{r} + (z + \alpha)\hat{z}]}{[r^2 + (z + \alpha)^2]^{3/2}}. \quad (3)$$

The perturbed electric field within the target material $E_B$ can be derived similar to the unperturbed field using an iterative method and is given by $$\overline{E}_B(r, z) = \frac{1}{2\pi(\varepsilon + \varepsilon_0)}\sum_{n=1}^{\infty} q_n \frac{[r\hat{r} + (z + \beta)\hat{z}]}{[r^2 + (z + \beta)^2]^{3/2}}, \quad (4)$$

where $$\beta = a'_n r_0, \quad a'_n = a'_1 - \frac{1}{a'_1 + a'_{n-1}},$$
$$q_n = t_n q, \quad t_n = \frac{b t_{n-1}}{a'_1 + a'_{n-1}}, \quad t_1 = 1, \quad (5)$$

and $$b = \frac{\varepsilon - \varepsilon_0}{\varepsilon + \varepsilon_0}.$$

The perturbed electric field $\overline{E}_A$ (FIG. 2) in the probe tip-target material region A is derived similar to equation (4) and is written as $$\overline{E}A(r, z) = \frac{1}{4\pi\varepsilon_0}\sum_{n=1}^{\infty} q_n \left[\frac{[r\hat{r} + (z + a'_n r_0)\hat{z}]}{[r^2 + (z + a'_n r_0)^2]^{\frac{3}{2}}} - b\frac{[r\hat{r} + (z - a'_n r_0)\hat{z}]}{[r^2 + (z - a'_n r_0)^2]^{\frac{3}{2}}}\right]. \quad (6)$$

The change in the resonant frequency in equation (1) outside the probe tip in region A is $$\left(\frac{\Delta f}{f}\right)_A = -C\sum_{n=1}^{\infty} t_n \left\{1 - \frac{1}{2}(1 + b)\frac{1}{a'_1 + a'_n}\right\}. \quad (7)$$

The resonant frequency shift component of equation (1) within the target material volume is $$\left(\frac{\Delta f}{f}\right)_B = -\left(\frac{\Delta\varepsilon}{E}\right)\frac{(4\pi\varepsilon_0)r_0 V_0^2}{(\varepsilon + \varepsilon_0)}\sum_{n=1}^{\infty}\frac{t_n}{(a'_1 + a'_n)}, \quad = -C\sum_{n=1}^{\infty}\frac{bt_n}{(a'_1 + a'_n)}, \quad (8)$$

where C is a geometry factor of the probe assembly.

The summation of equation (7) and equation (8) results in the over all resonant frequency shift due to the perturbed electric fields in both regions $$\left(\frac{\Delta f}{f_0}\right)_{A+B} = -C\sum_{n=1}^{\infty} t_n \left\{1 - \frac{1}{2}(1 - b)\frac{1}{a'_1 + a'_n}\right\}. \quad (9)$$

By taking into account the real part of equation (9), we obtain the following expression to find the complex permittivity and resonant frequency change, which is used to compare with our experimental data when the tip touches the target material (g=0):

$$f_r = f_0 / 1 + (C/4)\left(\frac{3}{2} + \sum_{n=1}^{\infty}\left[\frac{2n + 5}{(n + 1)(n + 2)}\right]R^n \cos n\phi\right). \quad (10)$$

The change in quality factor Q is derived similarly $$q_r = q_0 / 1 - (q_0)\left(\frac{C}{2}\right)\left(\sum_{n=1}^{\infty}\left[\frac{2n + 5}{(n + 1)(n + 2)}\right]R^n \sin n\phi\right), \quad (11)$$

where $R = ((\mathcal{E}'^2 + \mathcal{E}''^2 - 1)^2 + 4\mathcal{E}''^2)^{1/2}/((\mathcal{E}' + 1)^2 + \mathcal{E}''^2)$ $\phi = \tan^{-1}((2\mathcal{E}'\mathcal{E}'')/(\mathcal{E}'^2 + \mathcal{E}''^2 - 1))$ $\mathcal{E} = \mathcal{E}_0(\mathcal{E}' + i\mathcal{E}'')$.

Equations (10) and (11) can be used to fit the total shift in frequency and in Q to determine the real and imaginary components respectively of the local complex permittivity sensed by the probe tip. The total shift is comprised of a resonant frequency $f_0$ and $Q_0$ when the probe is not influenced by the target material (i.e., the reference measurement) in its near field and is due to its own self resonance. The material is then brought into the near field of the probe and touches the tip (i.e., the second measurement), resulting in a total shift in frequency to f and Q which is linearly fit between $f_0$, f and $Q_0$, Q to determine the localized complex permittivity parameters. The tissue samples are soft enough to allow the tip to touch the surface without damaging the probe, making the device unique for characterizing biological samples.

Thus, by using this methodology, unknown properties of the target material may be measured by taking a reference measurement (unperturbed), a second measurement (perturbed), and comparing the results.

As an exemplary embodiment using the aforementioned methodology, measurements of porcine skin tissue sample were taken, the results of which are described herein. The 5 porcine skin tissue samples were acquired from a local slaughter facility and the time duration from death to tissue sample characterization was less than 2 hours. The tissue samples were refrigerated at approximately 40° F. during transport. The origin of the porcine tissue samples used in this investigation is 18 to 20 month old males of American Yorkshire type and shoulder location. A total of six measurements were made in a linear fashion with 100 μm separation between discrete measurement locations at each frequency with the tissue sample surface dry at a temperature of 289 K. A single subject was used in the study.

A series of three line scan measurements were performed with the evanescent probe across the surface of an excised section of porcine tissue, resulting in three single line map of the change in quality factor profile of the nonuniformities, depth-wise in the tissue sample. The scan parameters for the tissue sample are $f_0$=1.1373 GHz with a probe tip standoff distance of 5 μm above the surface and 10 μm data step intervals recording resonant quality factor values over a scan length of 2000 μm. The Q of the probe is proportional to the changes in conductivity. Compared to the effect of conductivity on Q, changes in Q with variance of the probe tip to target material standoff height, g, will be relatively small due to geometric considerations. Namely, the decay length of the evanescent field in air is 350 μm, and the decay length with the skin sample present is at least 200 μm. Therefore, a change in standoff height of 5 or 10 μm between different skin locations does not change the source of the signal arising from the large volume of skin to depths of ~200 μm by more than a few percent. The resonant $f_0$ was chosen because it is the $\lambda/4$ fundamental frequency of the probe. Following the scans, the porcine skin was fixed in 10% formalin in phosphate-buffered saline, dehydrated in ethanol, and embedded in paraffin. Sections approximately 10 μm in thickness and 200 μm in length were mounted on glass slides and stained in hematoxylin and eosin and photographed for comparison against the line scan change in Q signature.

A skin surface puncture lesion was characterized in a two-step procedure. Initially, the lesion was scanned with the resonant probe, producing a relative change in frequency, Q, and reflection coefficient images over the scan area. The image scan area was 3 mm×3 mm with a probe standoff distance of 10 μm, step resolution of 100 μm, and a resonant frequency of 1.1373 GHz. Subsequently, complex dielectric measurements were performed using the aforementioned methodology and equations (3) and (4) at points of interest in the relative change in Q image. Three dielectric measurements were taken approximately 500 μm from the center of the lesion at 120° apart and indicated on the frequency shift image. The second set of three measurements were taken approximately 150 μm from the center of the lesion at 120° apart, and the final measurement point is centered in the puncture lesion at point. It was noted that prior to characterization, the puncture lesion appeared to be an older wound. The puncture site had dark coagulated blood and the immediate adjacent tissue was raised and pink in color.

Another porcine skin tissue sample had five separate burn areas on the surface, where the burn areas are of increasing severity labeled 1-5. The subsurface tissue damage should vary according to depth of involvement, resulting from acute thermal contact. The five burn marks were induced by direct contact of a tip from a standard soldering instrument. A 600° F. iron was held under constant pressure on the tissue surface from 1 to 5 seconds in duration. A series of complex permittivity measurements were made at several locations within each burn location area at a frequency of 1.1373 GHz.

Biological tissues are inhomogeneous and exhibit considerable variability in structural composition and, therefore, dielectric properties. The ranges of complex dielectric measurements were taken for the dielectric constant and dielectric loss, respectively. The statistical data are based on six random readings at each frequency and given in Tables I and II. Due to the lengthy experimental procedure of acquiring complex permittivity values at 15 discrete frequencies, only six data points were acquired to stay within the 2-hour sample maximum, so the data would not be biased from dehydration and give a reasonable estimate of reproducibility. The dielectric constant measurement results of our investigation ranged in values from 16.5 to 38.8. The dielectric loss values ranged from 5.4 to 28.5. The range of dielectric constant values for our data is 29-33 at 3 GHz compared to 19-22 for the data represented in other studies for 4- to 5-month-old porcine specimens. The subjects used in our study were around 18 to 20 months old and, in general, we would expect the subject to be less hydrated resulting in a lower dielectric constant and loss due to surface lipid chemical composition changes in the skin from birth to adolescence. However, numerous factors, such as sample handling, animal strain, feed routine, probe sensing depth and tissue temperature, were not identical between the other study and the existing study and these factors may have countered the expected trend. To compare measurement reproducibility between this study and a previous study, we calculated the standard error of the mean for the measurements in Tables I and II and obtained ranges of 0.025-0.966% for the dielectric constant, and 0.154-0.467% for dielectric loss. This level of variability is considerably smaller than the values of 5-10% for dielectric constant and 0.2-3% for dielectric loss. This indicates that the evanescent probe design and technique described here may be more reproducible.

Table I is shown below:

TABLE I

Dielectric constant standard error of the mean and 95% confidence interval.

| Frequency GHz | Std. Dev. | Std. Error | Mean | 95% |
|---|---|---|---|---|
| 1.116 | 1.943 | 0.793 | 25.25 | ±1.55 |
| 2.451 | 2.368 | 0.966 | 28.483 | ±2.92 |
| 3.699 | 1.205 | 0.491 | 30.916 | ±.962 |
| 4.363 | 2.239 | 0.914 | 29.08 | ±1.79 |
| 5.544 | 0.742 | 0.302 | 28.066 | ±.591 |
| 6.364 | 1.331 | 0.543 | 27.9 | ±1.06 |
| 7.088 | 1.499 | 0.611 | 27.216 | ±1.19 |
| 8.665 | 0.837 | 0.341 | 25.583 | ±.668 |
| 9.473 | 0.649 | 0.264 | 24.116 | ±.517 |
| 10.776 | 0.634 | 0.258 | 21.533 | ±.505 |
| 11.537 | 2.361 | 0.963 | 20.75 | ±1.88 |
| 12.445 | 1.1354 | 0.463 | 18.716 | ±.907 |
| 13.246 | 0.883 | 0.36 | 17.7 | ±.705 |
| 14.865 | 1.11 | 0.453 | 16.783 | ±.887 |

Table II is shown below:

TABLE II

Dielectric loss standard error of the mean and 95% confidence interval

| Frequency GHz | Std. Dev. | Std. Error | Mean | 95% |
|---|---|---|---|---|
| 1.116 | 1.402 | 0.572 | 18.667 | ±1.121 |
| 2.451 | 1.146 | 0.467 | 9.549 | ±.915 |
| 3.699 | 0.909 | 0.371 | 6.75 | ±.727 |
| 4.363 | 0.851 | 0.347 | 11.6 | ±.680 |
| 5.544 | 1.081 | 0.441 | 12.933 | ±.864 |
| 6.364 | 0.806 | 0.329 | 14.933 | ±.644 |
| 7.088 | 0.516 | 0.21 | 15.733 | ±.411 |
| 8.665 | 0.377 | 0.153 | 16.633 | ±.299 |
| 9.473 | 0.56 | 0.228 | 17.867 | ±.446 |
| 10.776 | 0.849 | 0.346 | 18.483 | ±.678 |
| 11.537 | 1.031 | 0.42 | 19.9 | ±.823 |
| 12.445 | 0.594 | 0.242 | 22.483 | ±.474 |
| 13.246 | 0.56 | 0.228 | 25.533 | ±.446 |
| 14.865 | 0.604 | 0.246 | 27.583 | ±.482 |

The dielectric constant data measured in this study show an increase from 1 GHz to 3 GHz. and then decreases above 3 GHz. The expected trend was for the dielectric constant to decrease with increasing frequency over the entire frequency range due to γ dispersion resulting from the polarization of water molecules. One possible explanation for the increase between 1 GHz and 3 GHz is that this was an artifact caused by limited tissue thickness leading to secondary field reflections. It should be noted that in a previous study, the trend in the dielectric constant between 1 GHz and 3 GHz is also not smoothly downward. At present, it is unlikely that the dielectric constant increases with frequency over this frequency range due to physical implausibility, but further studies may be performed to rule out this possibility.

In another skin tissue sample, the ΔQ was measured which provided an image for the corresponding subsurface tissue histological structure. The prepared tissue slides and line scan measurements show a relation of ΔQ (conductivity) signal strengths and corresponding biological structures such as ducts of exocrine sweat glands and vein lumen ducts. The tissue slide sample edges were curled during processing and the tissue appears to be slightly stretched, but the tissue structure-signal match up can be seen fairly well. The longest skin structure seen by the probe is the exocrine duct in between 0.6 mm and 1.0 mm on the X-axis and extends from the surface to approximately 0.375 mm into the dermis. There is a large signal peak between 0.5 mm and 0.1 mm that could be due to a gland or vein that is out of the plane of the slide since the histology slice is only 10 μm, whereas the spatial region being detected by the probe certainly includes an area wider than 10 μm due to the spreading of the field emanating off the probe tip. There are three vein ducts, two of which are distinct, traversing the dermis tissue in the plane of the slide and are shown at 0.0-0.25 mm, 0.5-0.8 mm and 1.0-1.3 mm on the X-axis. There is also a signal peak between 1.4 mm and 1.9 mm that does not correspond to any subsurface feature in the histology slide, which again may be due to a structure outside of the plane of the slide. The depths of the vein lumen are approximately from 0.25 mm to 0.3 mm. The majority of the smaller signal peaks may correspond to capillary beds near the surface, which reveal residual blood serum from the staining process and are considered more conductive than dielectric and/or spatial heterogeneity. The capillary beds are located under the epidermis layer and have an average depth of 35 μm. However, the source of these small fluctuations with position is not entirely clear and may also include contributions from variations in probe-to-skin standoff height or other types of biological variability with position. The probe tip radius is 10 μm and the spatial resolution of the probe is governed by this physical dimension, but the aperture diameter along with the tissue properties dictates the evanescent field decay length. The corresponding ΔQ signal widths will be slightly larger than the lumen ducts and gland structures the evanescent field detects at tissue depths within the decay length of the field, due to the three-dimensional penumbral effect of the field emanating off the probe tip and widening depth-wise. This sensor appears that it could be used for superficial wound and burn assessment, but as far as the applicability to deep lacerations, the device may be presently limited from deep field penetration depth.

The surface puncture lesion (described above) was scanned, producing a change in the resonance frequency, Q, and reflection coefficient images. The change in the frequency image contains surface topography and dielectric properties, while the change in the Q image shows the variations in conductivity, which is the inverse of the change in the reflection coefficient image and indicates the resistive properties of the tissue sample. The total shift in resonant frequency and Q measurements was model fit, resulting in dielectric property values on and around the puncture lesion for seven separate locations. The real and imaginary parts of the complex dielectric measurement are given in Table III. The outermost points (A-C) are comparable to normal tissue values. The immediate surrounding data (D-F) indicate a higher conductivity and lower dielectric constant, than measured at this frequency in normal tissues. The measurement of the puncture lesion indicate a low conductivity and a high dielectric constant at point G, which is centered on the puncture wound and corresponds to dry coagulated blood cells. The age of the puncture wound and the possibility of dilated and leaking capillary beds and/or infection could explain the higher conductivity readings in the immediate surrounding tissue.

Table III is shown below:

TABLE III

Tissue puncture lesion measurement location

| Sample Point | ϵ' | ϵ" |
|---|---|---|
| A | 26.1 | 20 |
| B | 19 | 21.7 |
| C | 27 | 18.7 |
| D | 17.9 | 23.7 |
| E | 17.5 | 24.1 |
| F | 18.2 | 23.4 |
| G | 38 | 2.1 |

The tissue surface burn data shown in Table IV shows a higher dielectric constant and slightly lower related loss in comparison to normal tissue values.

Table IV is shown below:

TABLE IV

Tissue burn lesion section measurements and mean

| SAMPLE | ϵ' | ϵ" |
|---|---|---|
| 1 | 40.3 | 17.2 |
| 1a | 45.1 | 18.1 |
| 1b | 48.7 | 15.8 |
| 1c | 39.3 | 17.4 |
| 1d | 52.7 | 14.4 |
| mean | 45.22 | 16.6 |

TABLE IV-continued

Tissue burn lesion section measurements and mean

| SAMPLE | $\epsilon'$ | $\epsilon''$ |
|---|---|---|
| 2 | 36.5 | 21.7 |
| 2a | 29.1 | 19.3 |
| 2b | 33.4 | 20.8 |
| 2c | 35.7 | 17.9 |
| 2d | 30.2 | 20.2 |
| mean | 32.98 | 19.98 |
| 3 | 37.1 | 3.2 |
| 3a | 38.3 | 3.9 |
| 3b | 35.7 | 3.3 |
| 3c | 39.4 | 2.8 |
| 3d | 38.7 | 3.1 |
| mean | 37.8 | 3.25 |
| 4 | 20.5 | 2.4 |
| 4a | 23 | 2.9 |
| 4b | 18 | 3.2 |
| 4c | 25.7 | 2.6 |
| 4d | 19.7 | 3 |
| mean | 21.38 | 2.82 |
| 5 | 9.3 | 0.78 |
| 5a | 7.9 | 0.188 |
| 5b | 8.7 | 0.137 |
| 5c | 8.9 | 0.212 |
| 5d | 8.6 | 0.204 |
| mean | 8.68 | 0.304 |

This experimental exercise produced dielectric constant and loss measurements that were carried out in vitro on freshly excised tissue by the probe. The technique used in this study produced dielectric and conductivity values and trends for porcine skin tissue consistent with those seen by the open-ended coaxial technique. The results indicate that this technique could be used for superficial wound assessment, but as far as the applicability to deep wounds the device may be presently limited by penetration depth. The burn data indicate appreciable dielectric property differences with thermal damage levels and show promise that the evanescent technique could be used for burn evaluation. Although the research was conducted in vitro and live tissue exhibits full physiological and anatomical functional activity when burned, an in vivo study may still produce significant enough thermal level data differences to make the technique useful. The probe indicates a capability to detect capillary beds and veins within the tissue from conductivity signatures; therefore, it is conceivable that this may be extended in utilizing the sensor in monitoring skin tumor angiogenesis and performance of endogenous inhibitors.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present disclosure.

For the purposes of describing and defining the present invention it is noted that the term "approximately" is utilized herein to represent the inherent degree of uncertainty that may be attributed to any quantitative comparison, value, measurement, or other representation.

Having described the invention in detail and by reference to specific embodiments thereof, it will be apparent that modifications and variations are possible without departing from the scope of the invention defined in the appended claims. Accordingly, all variations of the present invention that would readily occur to one of ordinary skill in the art are contemplated to be within the scope of the present invention. Thus, the present invention is not to be limited to the examples and embodiments set forth herein. Rather, the claims alone shall set for the metes and bounds of the present invention.

The invention claimed is:

1. A method of measuring an unknown property of a target material with an evanescent microwave microscopy probe, the method of measuring an unknown property comprising:
   adjusting a position of a probe tip of a microwave microscopy probe to a reference distance g from a target material, the microwave microscopy probe comprising a center conductor, an outer shield, an insulating material, and an aperture, wherein:
      the center conductor is at least approximately 90%, by weight, silver and is capable of operating as a waveguide for microwave radiation;
      a first end of the center conductor tapers to the probe tip capable of acquiring a near-field microwave signal from the target material;
      the outer shield surrounds the center conductor;
      the center conductor and the outer shield are in a generally coaxial relationship;
      the center conductor and the outer shield are not in direct contact such that a gap exists between the center conductor and the outer shield;
      the insulating material occupies at least a portion of the gap between the center conductor and the outer shield;
      the aperture is located near the probe tip and comprises a plate comprising an inside face, an outside face, and a hole having a diameter d that allows the probe tip to be in microwave communication with the target material; and
      the reference distance g is greater than the diameter d of the hole;
   taking a reference measurement of at least one inherent characteristic of the probe while the probe tip is at the reference distance g;
   adjusting the position of the probe tip such that the probe tip is in physical contact with the target material;
   taking a second measurement of the inherent characteristic while the probe tip is in physical contact with the target material; and
   determining the unknown property of the target material by comparing the reference measurement and the second measurement.

2. The method of claim 1, wherein the center conductor comprises an alloy comprising silver and one or more of copper, zinc, tin, or combinations thereof.

3. The method of claim 1, wherein the center conductor comprises an alloy comprising silver and copper.

4. The method of claim 3, wherein the center conductor comprises approximately 97.5%, by weight, silver and approximately 2.5%, by weight, copper.

5. The method of claim 1, wherein the unknown property comprises permittivity, permeability, conductivity, dielectric loss, or dielectric constant of the target material.

6. The method of claim 1, wherein:
   the probe is characterized by a quality factor (Q), a resonant frequency ($f_r$), or a reflection coefficient ($S_{11}$); and
   the inherent characteristic measured comprises the quality factor (Q) of the probe, a resonant frequency ($f_r$) of the probe, a reflection coefficient ($S_{11}$) of the probe, or combinations thereof.

7. The method of claim 1 wherein the target material is skin tissue from a human or an animal.

8. The method of claim 7 wherein the method is operable to produce an image representing the capillary beds, ducts of exocrine sweat glands, epidermis tissue, dermis tissue, or vein lumen ducts of the skin tissue.

9. An evanescent microwave microscopy probe comprising a center conductor, an outer shield, an insulating material, and an aperture, wherein:

the center conductor is capable of operating as a waveguide for microwave radiation and comprises at least approximately 90%, by weight, silver;

a first end of the center conductor tapers to a probe tip capable of acquiring a near-field microwave signal from a target material;

the outer shield surrounds the center conductor;

the center conductor and the outer shield are in a generally coaxial relationship;

the center conductor and the outer shield are not in direct contact such that a gap exists between the center conductor and the outer shield;

the insulating material occupies at least a portion of the gap between the center conductor and the outer shield;

the aperture is located near the probe tip and comprises a plate comprising an inside face, an outside face, and a hole that allows the probe tip to be in microwave communication with the target material; and the aperture is oriented generally perpendicular to the center conductor.

10. The probe of claim 9, wherein the insulating material is selected from paraffin, magnesium oxide, titanium oxide, boron nitride, alumina, an organic polymer, or any combination of two or more thereof.

11. The probe of claim 9, wherein the plate is affixed to the outer shield with solder.

12. The probe of claim 9, wherein the center conductor comprises an alloy comprising silver and one or more of copper, zinc, tin, or combinations thereof.

13. The probe of claim 9, wherein the center conductor comprises an alloy comprising silver and copper.

14. The probe of claim 13, wherein the center conductor comprises an alloy comprising approximately 97.5%, by weight, silver and approximately 2.5%, by weight, copper.

15. The probe of claim 9, wherein the inside face of the plate includes a chamfered surface about the circumference defining the hole.

16. The probe of claim 15, wherein a ceramic coating is disposed on the chamfered surface.

17. The probe of claim 9, wherein the aperture plate comprises copper, copper alloy, aluminum, brass, alum, or combinations thereof, and has a thickness of about 0.010 inches.

18. The probe of claim 9 further comprising a tuning network in electronic communication with the second end of the center conductor and with the outer shield, wherein the tuning network comprises a pair of capacitors in a parallel electronic relationship.

* * * * *